US007359354B2

(12) United States Patent
Julka et al.

(10) Patent No.: US 7,359,354 B2
(45) Date of Patent: Apr. 15, 2008

(54) METHOD AND APPARATUS TO REDUCE PACKET DATA LINK RENEGOTIATIONS IN A WIRELESS MOBILE NETWORK

(75) Inventors: Vibhor Julka, San Diego, CA (US); Roger Gustavsson, Sollentuna (SE); Erik Colban, San Diego, CA (US)

(73) Assignee: Telefonaktiebolaget LM Ericsson (publ) (SE)

( * ) Notice: Subject to any disclaimer, the term of this patent is extended or adjusted under 35 U.S.C. 154(b) by 782 days.

(21) Appl. No.: 10/865,356

(22) Filed: Jun. 10, 2004

(65) Prior Publication Data

US 2004/0258022 A1   Dec. 23, 2004

Related U.S. Application Data

(60) Provisional application No. 60/535,714, filed on Jan. 9, 2004, provisional application No. 60/495,917, filed on Aug. 18, 2003, provisional application No. 60/478,116, filed on Jun. 11, 2003.

(51) Int. Cl.
   *H04Q 7/00* (2006.01)
(52) U.S. Cl. ............. 370/331; 370/349; 370/392; 370/400; 455/436; 455/439
(58) Field of Classification Search ............. 370/331, 370/349, 392, 400, 401, 410; 455/436, 439, 455/442, 450, 464
   See application file for complete search history.

(56) References Cited

U.S. PATENT DOCUMENTS

| 6,708,031 B2* | 3/2004 | Purnadi et al. ............. 455/436 |
| 6,834,050 B1* | 12/2004 | Madour et al. ............. 370/392 |
| 2002/0057658 A1 | 5/2002 | Lim |
| 2002/0067707 A1* | 6/2002 | Morales et al. ............. 370/331 |
| 2002/0141361 A1 | 10/2002 | Madour et al. |

(Continued)

FOREIGN PATENT DOCUMENTS

WO    WO 01/50783    7/2001

(Continued)

OTHER PUBLICATIONS

"3GPP2 Access Network Interfaces Interoperability Specification Release A" 3GPP, Jan. 18, 2000, XP002201614.

(Continued)

*Primary Examiner*—Matthew Anderson
*Assistant Examiner*—Minh Dao
(74) *Attorney, Agent, or Firm*—Coats & Bennett, P.L.L.C.

(57) ABSTRACT

A wireless communication network updates packet zone tracking variables for mobile stations having packet data connections with the network in a manner consistent with that used by the mobile stations for their locally stored packet zone tracking variables. The network consequently reduces the incidence of unnecessary link renegotiations by reducing mismatches between network-stored and mobile-stored packet zone tracking information. A network routing entity may be configured to update a stored packet zone tracking variable for a mobile station if that mobile's link is renegotiated in dormant handoff of the mobile station but not for hard handoff renegotiations. The entity may maintain two or more tracking variables for the mobile station, one that is updated for hard and dormant handoff renegotiations, and one that is updated for dormant handoff renegotiations so as to better match the mobile-stored variable. A third tracking variable may be passed by base stations during hard handoff.

40 Claims, 11 Drawing Sheets

U.S. PATENT DOCUMENTS

| | | | |
|---|---|---|---|
| 2002/0176382 A1* | 11/2002 | Madour et al. | 370/331 |
| 2003/0053431 A1* | 3/2003 | Madour | 370/331 |
| 2005/0185623 A1* | 8/2005 | Ray et al. | 370/338 |
| 2006/0007862 A1* | 1/2006 | Sayeedi et al. | 370/235 |
| 2006/0062180 A1* | 3/2006 | Sayeedi et al. | 370/328 |
| 2006/0072506 A1* | 4/2006 | Sayeedi et al. | 370/331 |

OTHER PUBLICATIONS

Ville Ollikainen, MOBILE IP explained; Helsinki University of Technology, Tik-111.550:Seminar on Multimedia, spring 1999; 16 pgs.

C. Perkins; Network Working Group; rfc2002; IP Mobility Support; Oct. 1996; 70 pgs.

* cited by examiner

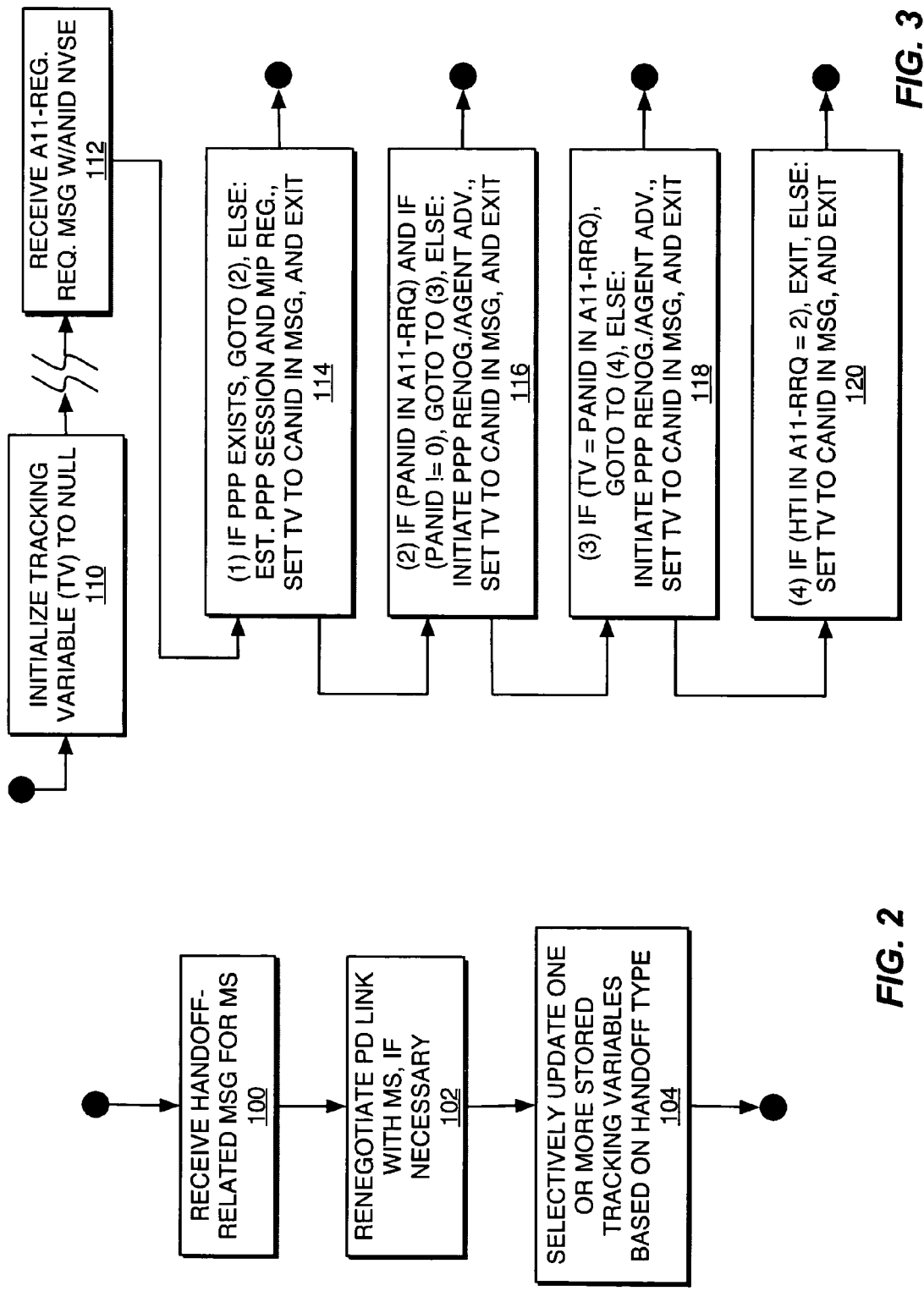

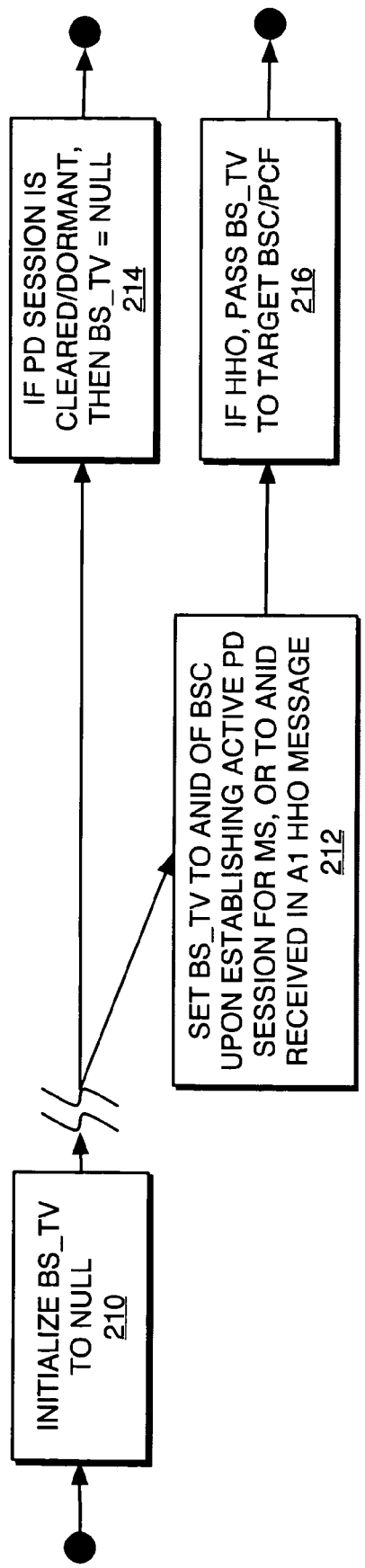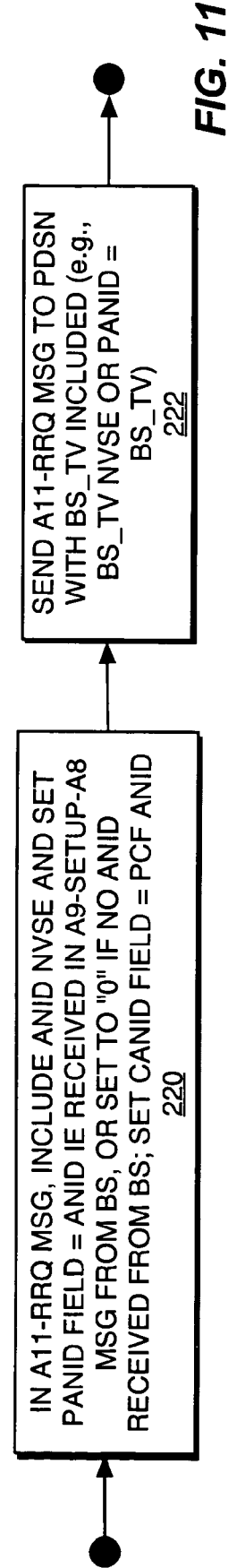
FIG. 10
FIG. 11

METHOD AND APPARATUS TO REDUCE PACKET DATA LINK RENEGOTIATIONS IN A WIRELESS MOBILE NETWORK

RELATED APPLICATIONS

This application claims priority under 35 U.S.C. § 119(e) from the following U.S. provisional applications: Application Ser. No. 60/478,116 filed on Jun. 11, 2003, application Ser. No. 60/495,917 filed on Aug. 18, 2003, and application Ser. No. 60/535,714 filed on Jan. 9, 2004. These applications are expressly incorporated in their entireties by reference herein.

BACKGROUND OF THE INVENTION

The present invention generally relates to wireless communication networks, and particularly relates to managing packet data connections in such networks.

With the change-over to an emphasis on packetized data services, current and planned wireless communication networks include mobility management features that enable packet data connections with mobile stations to be maintained as the mobile stations move within and between the networks. For example, in current and planned iterations of cdma2000 wireless networks, the so-called "packet core network" provides packet-data-based registration, roaming, and forwarding services for mobile stations using Internet Protocol (IP) centric routing. Various other existent or planned wireless network standards, such as Wideband CDMA, provide similar packet data routing capabilities.

The typical cdma2000 network is subdivided into so-called "packet zones," with each zone served by a unique combination of a Packet Data Serving Node (PDSN) and a Packet Control Function (PCF). Each PCF typically is associated with one or more Base Stations (BSs), thus the "packet zone" coverage of each PCF "maps" to the radio coverage of its associated BSs. Each PDSN may support one, or many PCFs, and the typical network may include any number of PDSNs. Regardless, when providing packet data connectivity between the network and a given mobile station, the network establishes a Point-to-Point Protocol (PPP) connection to the mobile station, with one end of the PPP link logically anchored at a selected one of the PDSNs, and with the other end logically anchored at the connected mobile station.

When a mobile station with an active packet data call undergoes an inter-BS hard handoff (HHO), it is often the case that the mobile station also has traversed a packet zone boundary, which is referred to as an inter-BS/inter-PCF HHO. In such cases, the target BS must set up connections to a new PCF and, in some cases, to a new Packet Data Serving Node (PDSN).

If the HHO was to a different PDSN, the underlying mobility event has changed the Foreign Network association of the mobile station, since each PDSN emulates a different Foreign Agent within the Mobile IP network infrastructure. With the Foreign Agent change, the target PDSN is required to perform PPP re-negotiation and carry out Agent Advertisement procedures to update the associated bindings. Such procedures generally comprise updating the mobile station's "care of" address, and typically involve Agent Discovery processing based on the exchange of Agent Advertisement and Agent Solicitation messages.

Thus, inter-PDSN mobile station handoffs require PPP re-negotiations and Foreign Agent Advertisement procedures. Conversely, intra-PDSN mobile station handoffs typically do not require link re-negotiation and agent advertisement procedures, because the mobile station remains under the care of the same PDSN, i.e., the target BS/PCF and source BS/PCF are under the same PDSN. These general requirements apply both to HHO (active connection) and "dormant" handoff (DHO), where the mobile station's data connection is not being used. Recognizing the handoff cases that require PPP link re-negotiation and agent advertisements versus those that do not is aided by the use of packet zone tracking variables, which allow PDSNs to track the prior and current packet zone locations of a mobile station undergoing a mobility event, i.e., undergoing some type of handoff.

For example, "Interoperability Specification (IOS) for cdma2000 Access Network Interfaces—Part 3 Features," released as 3GPP2 A.S0013-A by the 3rd Generation Partnership Project 2 (3GGP2), sets forth the use of "Previous Access Network Identifiers" or PANIDs and "Current Access Network Identifiers" or CANIDs, in the context of packet data link mobility management. Each PCF in a given network is uniquely identified by an Access Network Identifier (ANID), which may comprise a combination of Packet Zone Identifier (PZID), Network Identifier (NID), and System Identifier (SID). Thus, PANID and CANID information can be used to track movement of mobile stations between packet zones of the network.

In general terms, when a PDSN receives a registration message for a given mobile station, which happens for new call setups and for mobility events, for example, it determines whether it has an established packet data connection for that particular mobile station. If not, the PDSN establishes a connection for the mobile station. If a previous connection exists, the PDSN still will perform re-negotiation of the connection and carry out Foreign Agent Advertisement if it cannot verify that the mobile station has not moved out of, and then back into, the PDSN's coverage area without detection by the PDSN. Such checks are based on comparing PANID information received in the registration message with PANID information stored at the PDSN for the mobile station's existing connection.

If mismatching PANID information is received, or if no PANID information is received, the PDSN assumes that re-negotiation of the connection and agent advertisements are needed, and thus carries out such processing. To the extent that PANID mismatches at the PDSN can occur in circumstances where the mobile station remained under the same PDSN, but underwent one or more particular combinations of intra-PDSN hard and dormant handoffs, such re-negotiations and agent advertisements represent unnecessary signaling and processing overhead.

Mismatches may occur for a number of reasons. In particular, in existing networks, PDSN's typically store PANID information for each mobile station's packet data connection, and update that stored PANID responsive to packet zone movement of the mobile stations, irrespective of whether that movement arises in the context of dormant or hard handoffs. Conversely, the PANID information stored at mobile stations typically is updated during dormant handoff events, but is not updated during hard handoffs.

Specifically, a dormant mobile station monitors one or more broadcast or overhead channels transmitted in each radio sector or Access Network coverage area to identify its current packet zone location. Thus, a dormant mobile station recognizes that it has undergone dormant handoff between packet zones by periodically comparing the ANID information being broadcast with its stored PANID information. Upon detecting a mismatch, the dormant mobile station sends an Origination Message or other notification to the network to trigger packet data re-registration, and it updates its stored PANID information to reflect its current location. The PDSN typically updates its stored PANID for the mobile station as part of this dormant re-registration process.

However, mobile stations typically do not monitor these broadcast channels when they are in an active packet data call. Thus, the PANID information stored by a given mobile station becomes "out of date" or "stale" when it moves between packet zones during hard handoff. Indeed, the conventional mobile station typically holds the PANID value of the location where the call was first established, regardless of the number of subsequent hard handoffs it undergoes during that call, and updates that information only after the call ends and it goes dormant.

Simply put, the conventional PDSN updates its stored tracking variables for both hard and dormant handoffs of mobile stations, and typical mobile stations update their stored tracking variables during dormant but not hard handoffs. Thus, the PDSN-stored PANID information can become "unsynchronized" with the mobile-stored PANID information in cases where a mobile station having an established data connection at a given PDSN undergoes a combination of hard and dormant handoffs under that PDSN.

SUMMARY OF THE INVENTION

The present invention provides an apparatus and method for distinguishing between hard and dormant handoffs as part of mobility-event processing at routing entities (e.g., PDSNs) in an exemplary wireless communication network. As part of mobility event re-registration of mobile station, exemplary PCFs include an indication of the handoff type associated with the mobility event, i.e., they indicate to the supporting PDSN whether a given registration request message is being sent to the PDSN responsive to a hard handoff event, or responsive to a dormant handoff event.

Thus, in one embodiment of a wireless communication network, the exemplary PCF sends mobility-related registration messages to a supporting PDSN that include an indication of handoff type, i.e., hard or dormant handoff. In turn, the exemplary PDSN detects the type of handoff involved for the registration event, and conditions the algorithm it uses for triggering packet data connection re-renegotiation and agent advertisement on whether the mobility event is a hard or dormant handoff.

Thus, one or more embodiments of the present invention provide a method of reducing the incidence of unnecessary packet data link renegotiations between mobile stations and a supporting wireless communication network having multiple packet zones. Such reduction can be based on adapting the network so that it maintains packet zone tracking information that remains consistent with the mobile-stored tracking information, thereby reducing the incidence of mismatch between network-stored and mobile-stored packet zone tracking information.

An exemplary method thus comprises renegotiating the packet data link for a given mobile station responsive to determining that a received packet zone tracking variable included in a handoff-related message associated with the mobile station mismatches a stored packet zone tracking variable maintained at a network routing entity managing the packet data link. Further, the method comprises updating the stored packet zone tracking variable to match a current packet zone of the mobile station if the packet data link is renegotiated responsive to dormant handoff of the mobile station between packet zones but not if the packet data link is renegotiated responsive to hard handoff of the mobile station between packet zones.

By way of non-limiting example, the tracking variable may be maintained at a PDSN, or at a like routing entity in the network, that is responsible for managing the packet data links of mobile stations operating in packet zones that are associated with the Packet Data Serving Node. In an exemplary cdma2000 embodiment, a system includes a PDSN that is configured to maintain a packet zone tracking variable for each packet data link being supported by it, and to determine whether mobility events involving the mobile stations having those packet data links are hard handoff or dormant handoff events based on examining one or more indicator values, such as CVSE or NVSE values, included in the A11-Registration Request Messages (RRQs) sent from PCFs associated with different ones of the packet zones.

In another exemplary embodiment, the present invention comprises a method of reducing packet data link renegotiations based on maintaining first and second tracking variables in the network for tracking packet zone movement of the mobile station by selectively updating the first tracking variable responsive to hard handoff of the mobile station between packet zones, and selectively updating the second tracking variable responsive to dormant handoff of the mobile station between packet zones. For hard handoffs of the mobile station, renegotiation of the packet data link is selectively triggered based on comparing the first tracking variable to a previous packet zone identifier received for the mobile station in association with a hard handoff mobility event. For dormant handoffs of the mobile station, renegotiation of the packet data link is selectively triggered based on comparing the second tracking variable to a previous packet zone identifier received for the mobile station in association with a dormant handoff mobility event.

According to an exemplary embodiment of the above method, an explicit indication of handoff type (hard or dormant) is passed to a routing entity, e.g., a PDSN in the network. By default, the second variable is set to a null value, but gets set to the previous packet zone location identifier associated with the mobile station at the first hard handoff of the mobile station between packet zones under control of the routing entity. The second variable is tested, i.e., evaluated for link renegotiation triggering, when it is non-null on the first dormant handoff of the mobile station after it has gone dormant subsequent to a hard handoff.

A non-null value of the second variable can be guarded by a qualification timer and used in evaluating whether to trigger renegotiation if the timer is unexpired, but not if the timer is expired. In an exemplary embodiment, the qualification timer is started responsive to receiving an "all dormant" indication for the mobile station. In this manner, if the mobile station undergoes a dormant handoff within the lifetime of the timer, the second variable will be used to determine whether to trigger renegotiation and, optionally, foreign agent routing advertisements. If the timer has expired, the first tracking variable will be used in the renegotiation comparison.

Further, in one or more exemplary embodiments, the network may include BSs that are configured to pass the mobile-stored packet zone tracking variable along from source-to-target BS as part of hard handoff processing. In this manner, the mobile-stored packet zone tracking information, e.g., a mobile-stored PANID value, can be received at the HHO target BS, passed to the target PCF, and then passed from the target PCF to the target PDSN, which may be the same as the source PDSN. The target PDSN can thus use the mobile-stored tracking variable for comparison with one or more of its own tracking variables to determine whether re-renegotiation of the packet data connection is required. In this manner, the ANID of the packet zone where the mobile station's call was established "follows" the mobile station through successive hard handoffs by being passed from source-to-target BSs, and can be used by the target PDSNs to more reliably determine whether link re-negotiation is required, such as during a later dormant handoff event involving the same mobile station.

Of course, the present invention is not limited to the above features and advantages. Those skilled in the art will recognize additional features and advantages of the present invention upon reading the following detailed description and upon viewing the accompanying figures, in which like or similar elements are assigned like reference numbers.

BRIEF DESCRIPTION OF THE DRAWINGS

FIG. 2 is a diagram of exemplary processing logic for a network routing entity, e.g., a PDSN, according to one or more embodiments of the present invention.

FIG. 3 is a diagram of exemplary processing logic for a PDSN using a single, selectively updated tracking variable to manage packet data link renegotiations.

FIGS. 10 and 11 are diagrams of exemplary processing logic for a BSC and PCF, respectively, wherein the BSC uses a temporary packet zone tracking variable for mobile stations.

DETAILED DESCRIPTION OF THE INVENTION

The present invention provides a method and apparatus that, as part of packet data mobility management, reduces the incidence of unnecessary packet data link renegotiations. While at least some of the exemplary details for the present invention are presented within the context of cdma2000-based wireless communication networks, it should be appreciated by those skilled in the art that the present invention can be applied advantageously with respect to other types of networks where packet data routing involves one or more packet data routing zones and mobile devices moving therebetween, such as in Wideband CDMA (WCDMA) networks.

Figure 1:
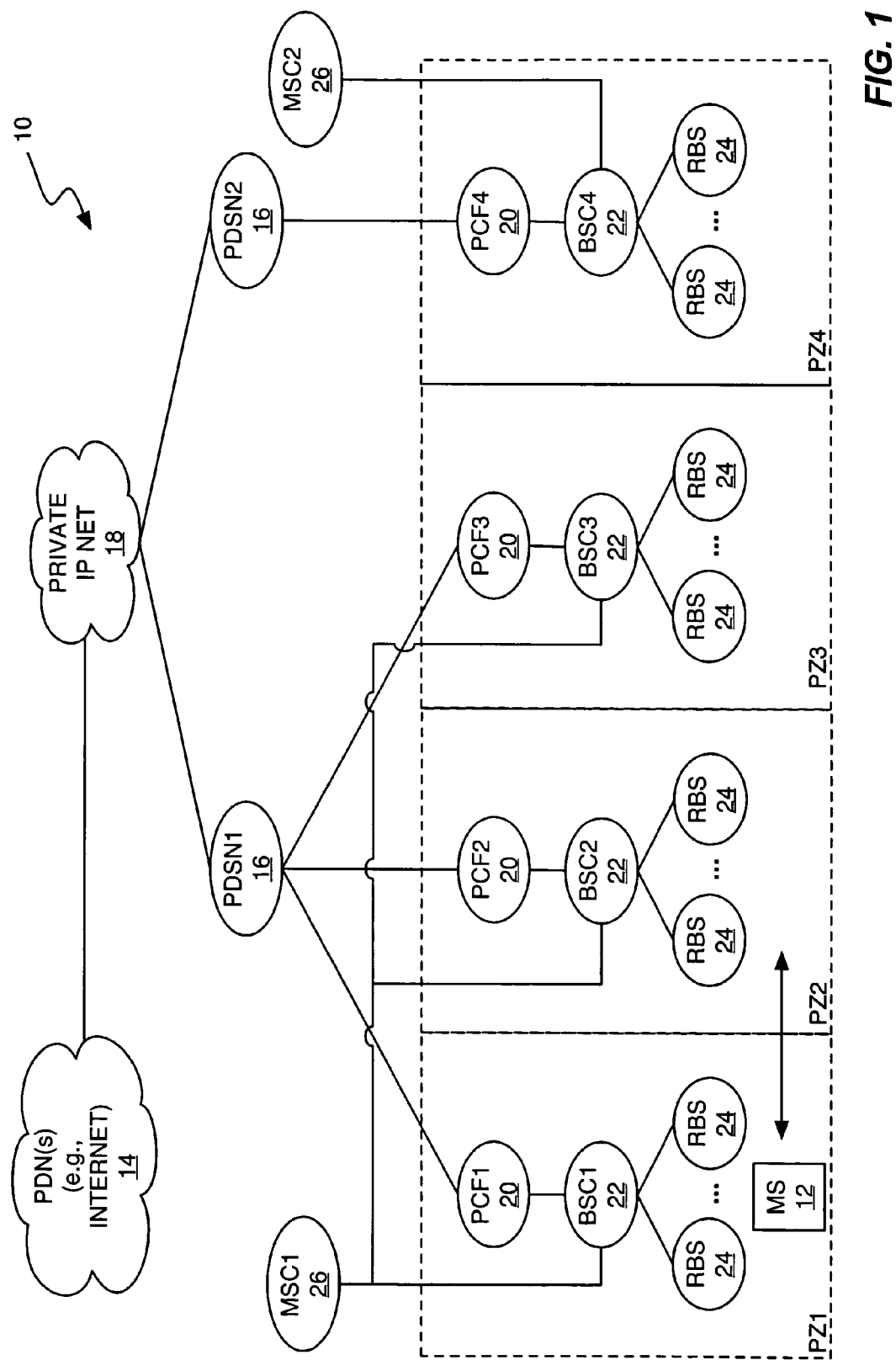
FIG. 1 is a diagram of an exemplary wireless communication network configured in accordance with one or more embodiments of the present invention.

Turning to the drawings, FIG. 1 illustrates an exemplary wireless communication network 10, that is configured in accordance with one or more embodiments of the present invention, and that communicatively couples mobile stations 12 to one or more Packet Data Networks (PDNs) 14, such as the Internet. Note that only one mobile station 12 is illustrated for ease of discussion, but it should be understood that network 10 might support a potentially large number of mobile stations 12 at any given time.

The exemplary network 10 comprises one or more PDSNs 16 that are coupled to PDN 14 via one or more private IP networks 18. Network 10 further comprises one or more PCFs 20, BSCs 22, Radio Base Stations (RBSs) 24, and MSCs 26. Those skilled in the art will appreciate that network 10 may include other entities not illustrated, such as Home Location Registers (HLRs), Visitor Location Registers (VLRs), Access/Authentication/Accounting (AAA) servers, etc.

Of more interest with respect to the present invention, network 10 provides packet data services in a plurality of "packet data zones," shown by way of example as PZ1 . . . PZ4. Packet data traffic is routed by network 10 according to the packet zone location of each mobile station 12. For example, packet data traffic for a mobile station 12 in PZ1 is handled by PDSN1, PCF1, and BSC1, and by PDSN1, PCF2, and BSC2, for a mobile station 12 in PZ2.

To enable packet data service, the mobile station 12 and network 10 establish a packet data link (PD link), which may comprise a PPP session, with each PPP session capable of supporting one or more packet data "service instances" or connections. One end of the PD link is logically anchored at the mobile station 12, and the other end of the link is anchored at the serving PDSN 16. The link must be reconfigured as needed as the mobile station 12 moves between packet zones in the network 10, and as the mobile station 12 enters or leaves network 10.

For example, if a mobile station 12 establishes a PPP session in PZ1, its PD link will be anchored at PDSN1, and PDSN1 will store a "tracking variable" that associates the mobile station's link with PZ1. More particularly, in accordance with the present invention, an exemplary PDSN 16 stores one or more tracking variables for each PD link supported by the PDSN 16 that are used to track packet data mobility events involving the corresponding mobile stations 12.

Such mobility events generally comprise hard handoffs, wherein a mobile station 12 changes packet zones while active in a packet data call, and dormant handoffs, wherein a mobile station 12 changes packet zones while in a dormant state, i.e., a state wherein all data connections on the mobile station's PD link are in a dormant state. Typically, dormancy is a time-qualified state of inactivity. For example, if a mobile station 12 has not sent or received any packet data traffic on any data connection associated with its PD link for longer than a given period of time that mobile station 12 is considered dormant.

While "remembering" packet zone locations of mobile stations is known in conventional packet data networks, the present invention reduces the incidence of unnecessary PD link renegotiations by more accurately managing the updating and use of network-stored tracking variables. In particular, unlike conventional approaches to tracking, an exemplary network according to one or more embodiments of the present invention updates one or more network-stored tracking variables selectively in response to mobile station mobility events, in dependence on whether those events correspond to hard handoffs or dormant handoffs.

By having at least one tracking variable whose updating logic is made dependent on determining the handoff type, one or more of the network's stored tracking variable(s) remains consistent with tracking variables stored at the mobile station. Since mismatch between the network-stored and mobile-stored tracking variables is a cause of unnecessary PD link renegotiation, the present invention's method reduces the incidence of unnecessary renegotiation by reducing the incidence of mismatch between network-stored and mobile-stored tracking variables.

For example, FIG. 2 illustrates one embodiment of exemplary processing logic in accordance with the present invention. In FIG. 2, processing begins with a routing entity in network 10 that is responsible for maintaining the PD link of a given mobile station 12 receiving a handoff-related message for the mobile station 12 (Step 100). For example, PDSN1 receives a handoff-related message for a mobile station 12.

If it is determined that PD link renegotiation is required, such as where the mobile station 12 moves between PDSNs and foreign agent advertisement processing must be carried out, the PD link is renegotiated, and agent advertisement procedures are carried out as needed (Step 102). Advertisement procedures may be based on MIP standards, for example.

At this point, unlike conventional packet data networks, network 10 according to the present invention makes a selective update of one or more network-stored tracking variables that are used to track the packet zone location of mobile station 12 (Step 104). A conventional network typically maintains a packet zone identifier to track packet data mobility events for a given mobile station, and updates that identifier to reflect changed packet zone associations of the mobile station irrespective of whether the mobile stations undergo hard or dormant handoffs.

In fleshing out exemplary PDSN processing logic for packet zone tracking in the above context, FIG. 3 illustrates the initialization of a tracking variable (denoted as "TV" in the illustration) to a null value by a PDSN 16, in preparation for its later use in tracking the packet zone associations of a given mobile station 12 (Step 110). In this context, the TV is nulled when the packet data connection is set up. The PDSN 16 then receives a handoff-related message for a mobile station 12 (Step 112).

In an exemplary embodiment for cdma2000 networks based on the IS-2000 standards, the handoff-related message comprises an A11-Registration Request Message (denoted herein as an "A11-RRQ message") that is sent by an associated PCF 20 that is supporting the mobile station 12.

According to defined network standards, A11-RRQ messages triggered by mobile station handoff include a "Mobility Event Indicator" or MEI. The presence of the MEI in a given A11-RRQ indicates that the registration message corresponds to a mobility event, e.g., to a hard or dormant handoff of the associated mobile station. However, the MEI does not provide the PDSN 16 with any indication of handoff type. Handoff-triggered A11-RRQ messages will include a Normal Vendor Specific Extension (NVSE) carrying Access Network Identification (ANID) information.

Of course, the MEI itself could be defined such that it takes on one value to indicate hard handoff mobility, and another value to indicate dormant handoff mobility. The advantage lies in obviating the need to add additional indicators to the A11 RRQ message, but redefining the MEI may raise issues of compatibility between PCFs configured to use the MEI in that manner, and conventional PDSNs not adapted to recognize such use.

In any case, responsive to receiving an A11-RRQ message with handoff type indication for a given mobile station, the exemplary PDSN 16 determines whether it has an existent PD link established for the mobile station 12 (Step 114). If no PD link already exists at the PDSN 16 for this particular mobile station 12, PDSN 16 establishes a PD link for the mobile station 12, i.e., it establishes a PPP session for the mobile station 12, and carries out Mobile IP registration procedures as needed. Further, PDSN 16 allocates a tracking variable to the just-established PD link and assigns it the CANID value received in the A11-RRQ message. The CANID uniquely identifies the particular PCF 20 that sent the A11-RRQ message. After setting the tracking variable, this branch of processing ends.

If, on the other hand, the PDSN 16 receives the A11-RRQ message and determines that it already has a PD link established for the mobile station, it checks whether a PANID was included in the received message (Step 116). If no PANID was included, or if the included PANID is zero, then PDSN 16 cannot identify the prior packet zone location of the mobile station 12 and thus it renegotiates the PD link to reflect the (presumably) new packet zone location of the mobile station 12, based on the message's included CANID. PDSN 16 carries out agent advertisement procedures as needed and updates the stored tracking variable associated with the mobile station's PD link to reflect the renegotiated link, i.e., the tracking variable is updated to the CANID.

However, if a non-zero PANID was included in the A11-RRQ message, PDSN 16 has a basis for comparing the last packet zone it associated with the mobile station's PD link, as reflected by the tracking variable stored for that link, with the last packet zone association of the mobile station 12 as reported in the A11-RRQ message by the PANID included in that message. Thus, if the A11-RRQ message includes a non-zero PANID, PDSN 16 compares the received PANID to the stored tracking variable (Step 118).

If the stored tracking variable and the received PANID do not match, the PDSN 16 carries out PD link renegotiation/ agent advertisement as described above, and updates its stored tracking variable to match the CANID received in the A11-RRQ message. In this manner, the PDSN's mismatched tracking variable accurately reflects the current packet zone location of the mobile station 12.

If, however, the stored tracking variable does match the received PANID, PDSN 16 does not renegotiate the PD link, but rather determines whether the stored tracking variable should be updated based on evaluating the type of mobility event giving rise to the A11-RRQ message (Step 120). According to one embodiment of the present invention, PCFs 20 are configured to include an indication of handoff type in the A11-RRQ messages transmitted by them, so that the receiving PDSNs 16 can determine whether a given mobility event involving a given mobile station 12 corresponds to a hard handoff, or to a dormant handoff.

In an exemplary embodiment, PCFs 20 are configured to include an indication of handoff type, i.e., hard or dormant, in the A11 RRQ messages transmitted by them to associated PDSNs 16 responsive to handoff-related mobility events. An exemplary PCF thus is configured to include a "Handoff Type Indicator" or HTI, which may be processed at the receiving PDSN 16 to identify the handoff type. Thus, the exemplary PDSN 16 is configured to identify a received A11-RRQ message as being associated with a mobile station mobility event based on, for example, recognizing the inclusion of a MEI in the message, and further to identify the type of handoff involved by inspecting the included HTI. For example, the HTI set to a first value indicates dormant handoff, and the HTI set to a second value indicates hard handoff. Thus, HTI=1 (or 2) means hard handoff, and HTI=2 (or 1) means dormant handoff. Of course, other indicator values can be chosen; all that matters is that PDSN 16 receives something that allows it to distinguish between mobility event handoff types.

Because mobile stations 12 generally do not update their stored packet zone tracking variables as part of hard handoff operations, but rather wait to update such information once they go dormant, PDSN 16 similarly does not update its stored tracking variable if the HTI indicates that the A11-RRQ message corresponds to a hard handoff mobility event. On the other hand, if PDSN 16 determines that the A11-RRQ message corresponds to a dormant handoff, it does update the tracking variable to reflect the updated packet zone location of the mobile station.

In this manner, updating of the network-stored tracking variable is deferred during hard handoffs in the same fashion that the mobile station's defer updating their tracking variables. The PDSN-stored tracking variables thus remain in synchronization with the mobile-stored tracking variables.

Figure 4:
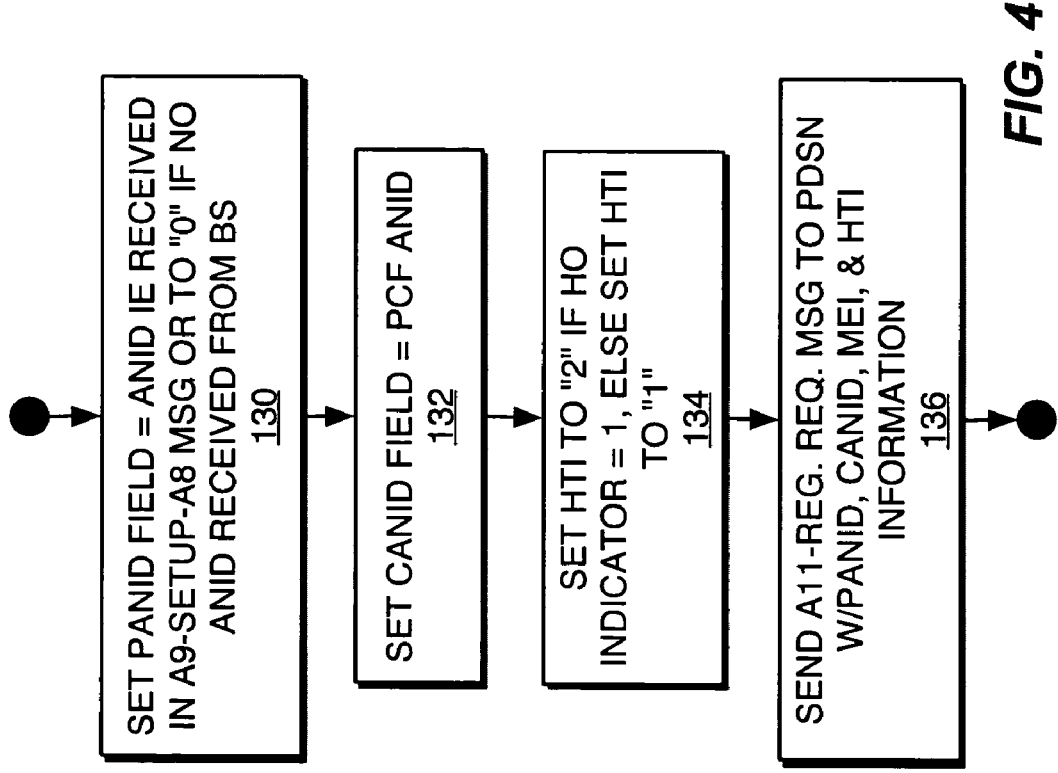
FIG. 4 is a diagram of exemplary processing logic for a PCF complementing the PDSN processing of FIG. 3.

FIG. 4 illustrates exemplary PCF-based processing logic corresponding to the exemplary PDSN-based processing logic of FIG. 3. With respect to generating a handoff related A11-RRQ message for transmission to a supporting PDSN 16, the exemplary PCF 20 sets the PANID field equal to the ANID IE received in the A9-Setup-A8 Message received from the PCF's associated BSC 22, or, if no ANID extension was included in that message, PCF 20 sets the PANID field to "0" (Step 130). Processing continues with the PCF 20 setting the CANID message field to the PCF's own ANID (Step 132), and setting the HTI value to "2" if the mobility event corresponds to a hard handoff of the mobile station 12, or to "1" if the mobility event corresponds to a dormant handoff of the mobile station 12 (Step 134). With the message information thus configured, the PCF 20 sends the A11-RRQ message to the PDSN 16 (Step 136).

Of course, it should be recognized that the above processing sets forth an exemplary mechanism for setting the HTI to its appropriate value. That is, the exemplary PCF 20 may determine the handoff type any number of ways, using available information and/or other messaging.

Figure 5:
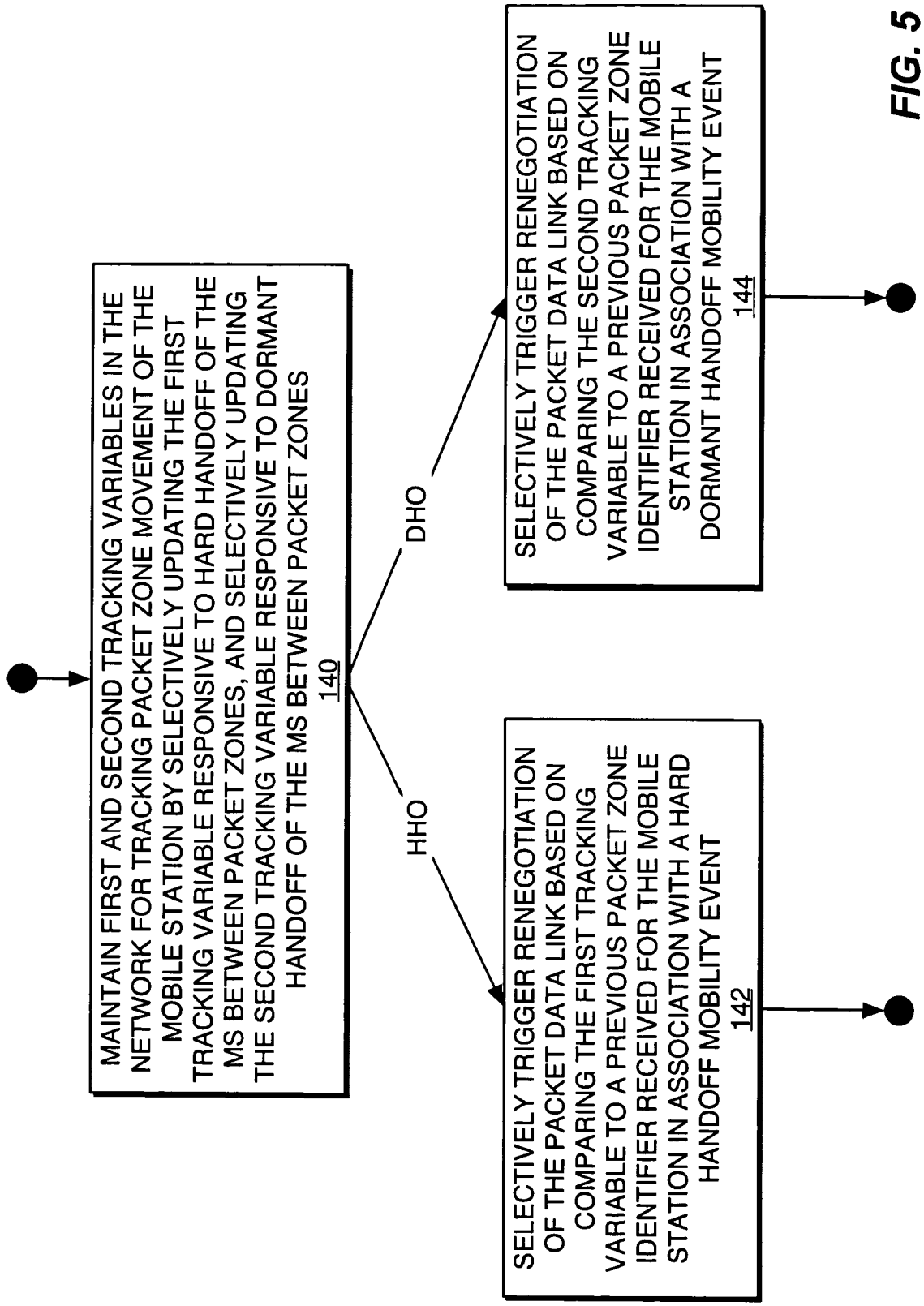
FIG. 5 is a diagram of exemplary processing logic for a PDSN using two, selectively updated tracking variables to manage packet data link renegotiations.

In continuing with the exemplary framework established by the processing logic illustrated in FIG. 3, FIG. 5 depicts PDSN-based processing logic wherein first and second tracking variables are maintained for an established PD link. The two variables are used to track packet data movement of the corresponding mobile station for purposes of selectively renegotiating the PD link as needed responsive to that movement.

Broadly, processing begins with the PDSN 16 maintaining first and second tracking variables in the network for tracking packet zone movement of a mobile station 12 having an established PD link. The tracking variables are maintained based on selectively updating the first tracking variable responsive to hard handoff of the mobile station between packet zones, and selectively updating the second tracking variable responsive to dormant handoff of the mobile station between packet zones (Step 140).

For hard handoffs of the mobile station 12, PDSN 16 selectively triggers renegotiation of the packet data link based on comparing the first tracking variable to a previous packet zone identifier received for the mobile station 12 in association with a hard handoff mobility event (Step 142). For dormant handoffs of the mobile station 12, PDSN 16 selectively triggers renegotiation of the packet data link based on comparing the second tracking variable to a previous packet zone identifier received for the mobile station 12 in association with a dormant handoff mobility event (Step 144).

In this manner, the updating of at least one tracking variable may be made consistent with the mobile station's updating of its stored PZID information. That method reduces the incidence of erroneous inconsistencies in the comparison of mobile-stored and network-stored tracking information that might otherwise arise when the mobile station 12 undergoes particular combinations of hard and/or dormant handoffs.

Figure 6:
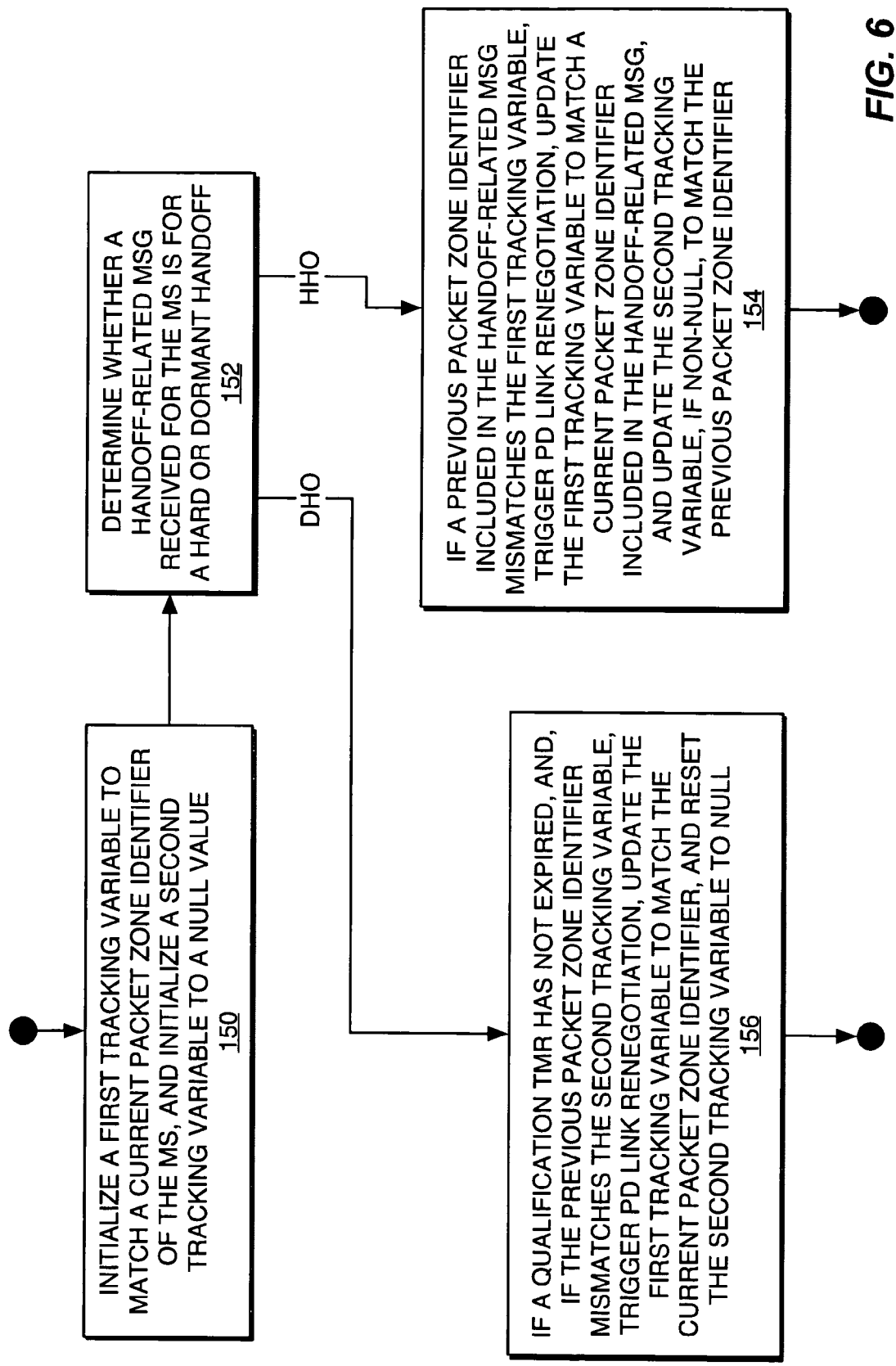
FIG. 6 is a diagram of exemplary processing logic for a PDSN using two, selectively updated tracking variables, subject to timer-qualification, to manage packet data link renegotiations.

FIG. 6 illustrates similar two-variable tracking logic, but in a context wherein time-qualification is used in the testing of one of the variables. This embodiment is explained broadly below, and then presented in greater detail later herein.

A first tracking variable is initialized to match the current packet zone identifier (CANID) of a mobile station 12 upon establishing a PD link between it and the PDSN 16, and a second tracking variable is initialized to a "Null" value (Step 150). In response to receiving a handoff-related message for the mobile station 12, which thus has an existent PD link, the PDSN 16 determines the handoff type (Step 152), and selectively renegotiates the PD link and updates the stored tracking variables as follows.

For hard handoffs, if a previous packet zone identifier included in the handoff-related message mismatches the first tracking variable stored at the network for the mobile station 12, PDSN 16 triggers packet data link renegotiations, updates the first tracking variable to match a current packet zone identifier included in the handoff-related message, and updates the second tracking variable, if non-null, to match the previous packet zone identifier (Step 154). In other words, for HHO, if the PANID included in a received A11-RRQ message mismatches the ANID value of the first tracking variable stored at the PDSN 16, the link is renegotiated, the first tracking variable is updated to the CANID received in the message, and the second tracking variable (if non-null) is updated to the received PANID.

For dormant handoff mobility events, if a qualification timer has not expired, and, if the previous packet zone identifier included in a handoff-related message mismatches the second tracking variable, PDSN 16 triggers packet data link renegotiations, updates the first tracking variable to match the current packet zone identifier, and resets the second tracking variable to null (Step 156). Further, for dormant handoff mobility events, if the qualification timer has expired, it resets the second tracking variable to null, and, if the first tracking variable mismatches the current packet zone identifier, the PDSN 16 triggers packet data link renegotiations and updates the first tracking variable to the current packet zone identifier.

Figure 7:
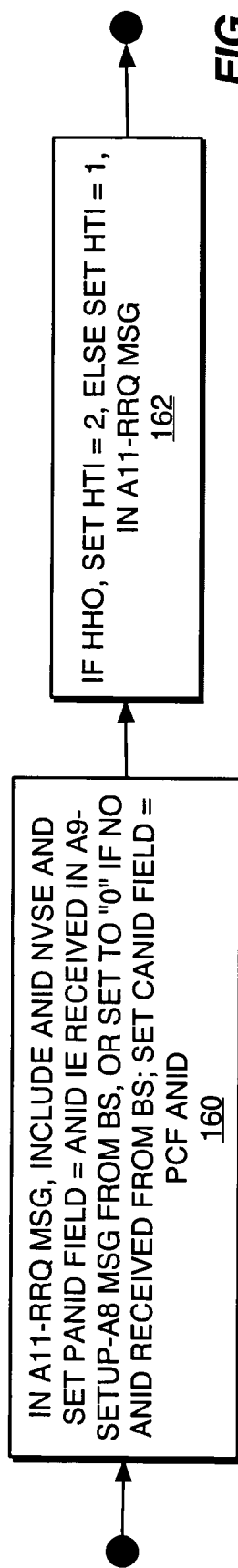
FIG. 7 is a diagram of exemplary processing logic for a PCF complementing the PDSN processing of FIGS. 5 and 6.

FIG. 7 illustrates corresponding exemplary PCF-based processing logic. As explained earlier herein, the PCF 20 includes an ANID NVSE in the A11-RRQ message generated by it, based on setting the PANID field to the ANID received from the associated BSC 22 in an A9-Setup-A8 Message, or to "0" if no ANID value is received from the base station (Step 160). Further, the PCF 20 sets the CANID field to its own ANID (Step 160), and then indicates the handoff type by setting the HTI to "2" for HHO, or to "1" for DHO (Step 162).

By passing an explicit indication (HTI=2) to the PDSN 16, the PDSN 16 can identify the mobility event as a hard handoff. In particular, in the above logic, a second tracking variable, which is denoted as "TV2," is defined. TV2 is null valued by default, but gets set to the PANID received in the A11-RRQ message as part of HHO processing (i.e., HTI=2). The only time TV2 is tested as a basis for retriggering link renegotiation is when it is non-null on the first dormant handoff after the mobile station goes dormant subsequent to undergoing a previous hard handoff. In other words, if TV2 is a non-null value, it is used as a basis for triggering PD link renegotiation responsive to receiving the first A11-RRQ message that includes an HTI=1 indicator after the PDSN has received an "all dormant" indicator for the mobile station's PD link. Such an indicator is received after the inactivity timer(s) for each data connection associated with the PD link have timed out, or is received responsive to some other dormancy detection mechanism.

Of course, it should be understood that use of an explicit HTI represents just one of a number of mechanisms suitable for passing handoff type information to the PDSN 16. Therefore, those skilled in the art should appreciate that use of HTIs in A11-RRQ message generation is an exemplary but non-limiting aspect of the present invention.

In any case, a non-null valued TV2 is guarded by the aforementioned qualification timer, which the PDSN 16 can maintain such that the timer is reset/started responsive to receiving the all dormant indicator, and such that it has a controlled expiration lifetime defined in seconds, minutes, etc. Thus, if a dormant handoff occurs within the expiration lifetime of the qualification timer, and if the TV2 value was previously set to a non-null value, TV2 is used as the basis for determining whether the PD link should be renegotiated.

Figure 8:
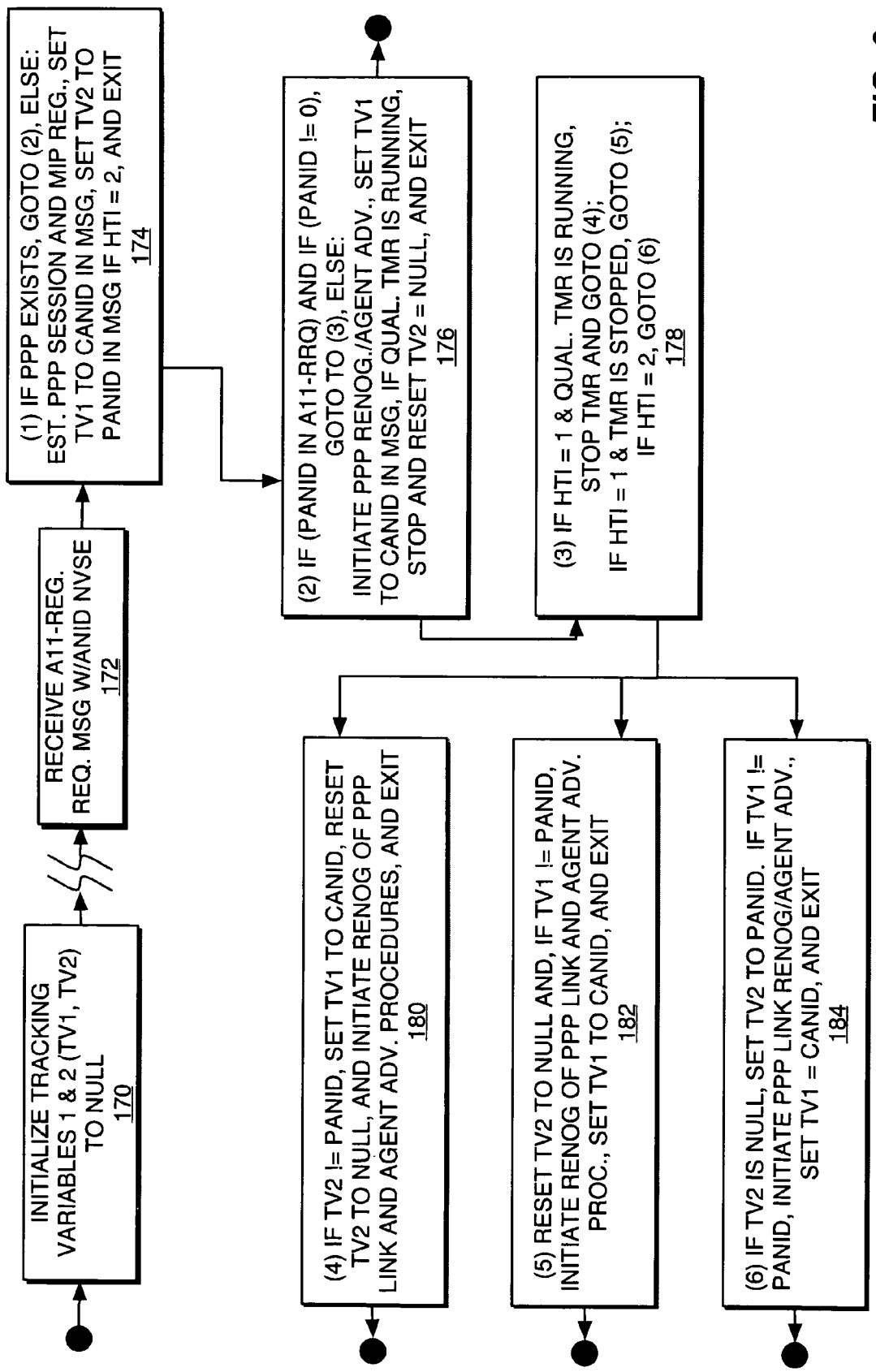
FIG. 8 is a diagram of exemplary processing logic details corresponding to FIG. 5.

FIG. 8 sets forth the above two-variables, timer-based processing logic in more detail. The algorithm provided by this exemplary processing logic conditions tracking variable updating and/or PD link re-negotiation/agent advertisement on determining mobility event handoff type. The exemplary processing is triggered responsive to receiving A11-RRQ messages for mobile stations having, or establishing, packet data connections with the PDSN 16.

Processing begins with the initialization of tracking variables TV1 and TV2 to null values by PDSN 16 at call setup, for example (Step 170). Upon receiving an A11-RRQ message with an ANID NVSE (Step 172), the PDSN 16 exercises exemplary processing logic as follows: (1) if a PD link (PPP session) exists for the mobile station 12, processing skips to (2); otherwise, the PDSN 16 establishes a PD link for mobile station 12, carries out MIP registration, sets TV1 to the received CANID, and sets TV2 to the received PANID if the message's HTI=2, i.e., the temporary tracking variable TV2 is set to the received PANID if the mobility event giving rise to the received A11-RRQ message is a hard handoff (Step 174).

If the PDSN 16 skipped to (2), processing continues (Step 176) with a determination of whether a PANID was received in the A11-RRQ message and, if so, whether that PANID had a non-zero value. If both conditions are met, processing skips to (3); otherwise, the PDSN 16 renegotiates the PD link, carries out agent advertisement procedures as needed, sets TV1 to the received CANID, and, if the qualification timer is unexpired (running), PDSN 16 stops the timer and resets TV2 to the null value. Processing then exits.

If the PDSN 16 skipped to (3), processing continues (Step 178) with an evaluation of the HTI included in the received A11-RRQ message, and of the qualification timer's state. If the HTI=1 (indicating DHO) and the timer is running, the PDSN 16 stops the timer and skips ahead to (4); if HTI=1 and the timer is not running, the PDSN 16 skips ahead to (5); otherwise, if HTI=2 (indicating HHO), the PDSN 16 skips ahead to (6).

If the PDSN 16 skipped to (4), processing continues (Step 180) with the PDSN 16 evaluating whether TV2 equals the received PANID. If TV2 does not equal the PANID, PDSN 16 sets TV1 to the received CANID, resets TV2 to null, initiates PD link renegotiation/agent advertisement, and processing exits.

If the PDSN 16 skipped to (5), processing continues (Step 182) with the PDSN 16 resetting TV2 to null, and evaluating whether TV1 equals the received PANID. If TV1 does not equal the PANID, PDSN 16 sets TV1 to the received CANID, initiates PD link renegotiation/agent advertisement, and processing exits.

If the PDSN 16 skipped to (6), processing continues (Step 184) with the PDSN 16 evaluating whether TV2 is null. If so, PDNS 16 sets TV2 to the received PANID. Further, if TV1 does not equal the received PANID, PDSN 16 sets TV1 to the received CANID, initiates PD link renegotiation/agent advertisement, and processing exits.

Thus, according to the above logic, the PDSN 16 maintains a first variable (TV1) that is initialized to the current packet zone location of the mobile station 12, and a second variable (TV2) that is initialized to a null value. TV2 is then updated to match the changed packet zone location of a mobile station 12 responsive to the first hard handoff of the mobile station with respect to the PDSN 16. The value of TV2 is then used to test whether PD link renegotiation is needed for the first dormant handoff of the mobile station 12 after the call ends under the PDSN 16, subject to the time qualification imposed by the qualification timer, which is started when the mobile station 12 first goes dormant under the PDSN 16. In all cases, TV1 is updated to reflect the CANID associated with the mobile station 12 responsive to renegotiating the mobile station's PD link.

To appreciate how the above processing reduces the incidence of unnecessary PD link renegotiations, consider a circumstance where a mobile station 12 originates (or re-activates) a packet data call under BSC3, which is under PDSN1, and then does a hard handoff to BSC4, which is under PDSN2. After hard handoff is complete, PDSN2 executes the above algorithm and correctly performs PD link renegotiation.

Additionally, PDSN2 sets the TV2 variable it stores for the mobile station's PD link to the PANID received in the A11-RRQ message generated in association with the hard handoff event. One should keep in mind, here, that the PANID was set by PCF4 to the ANID received by BSC4 in the handoff request message. Thus, the PANID received by PDSN2 was set by BSC4/PCF4 to the correct value (i.e., the BSC3 ANID) as part of the hard handoff event. Thus, the value of TV2 as stored at PDSN2 is a correction reflection of the PANID value stored in the mobile station 12 and, therefore, if the mobile station 12 then goes dormant under BSC4/PCF4 (i.e., goes dormant in PZ4), the PANID received by PDSN2 in response to the mobile station origination will match the TV2 value stored by PDSN2. The match avoids unnecessary PD link renegotiation.

Figure 9:
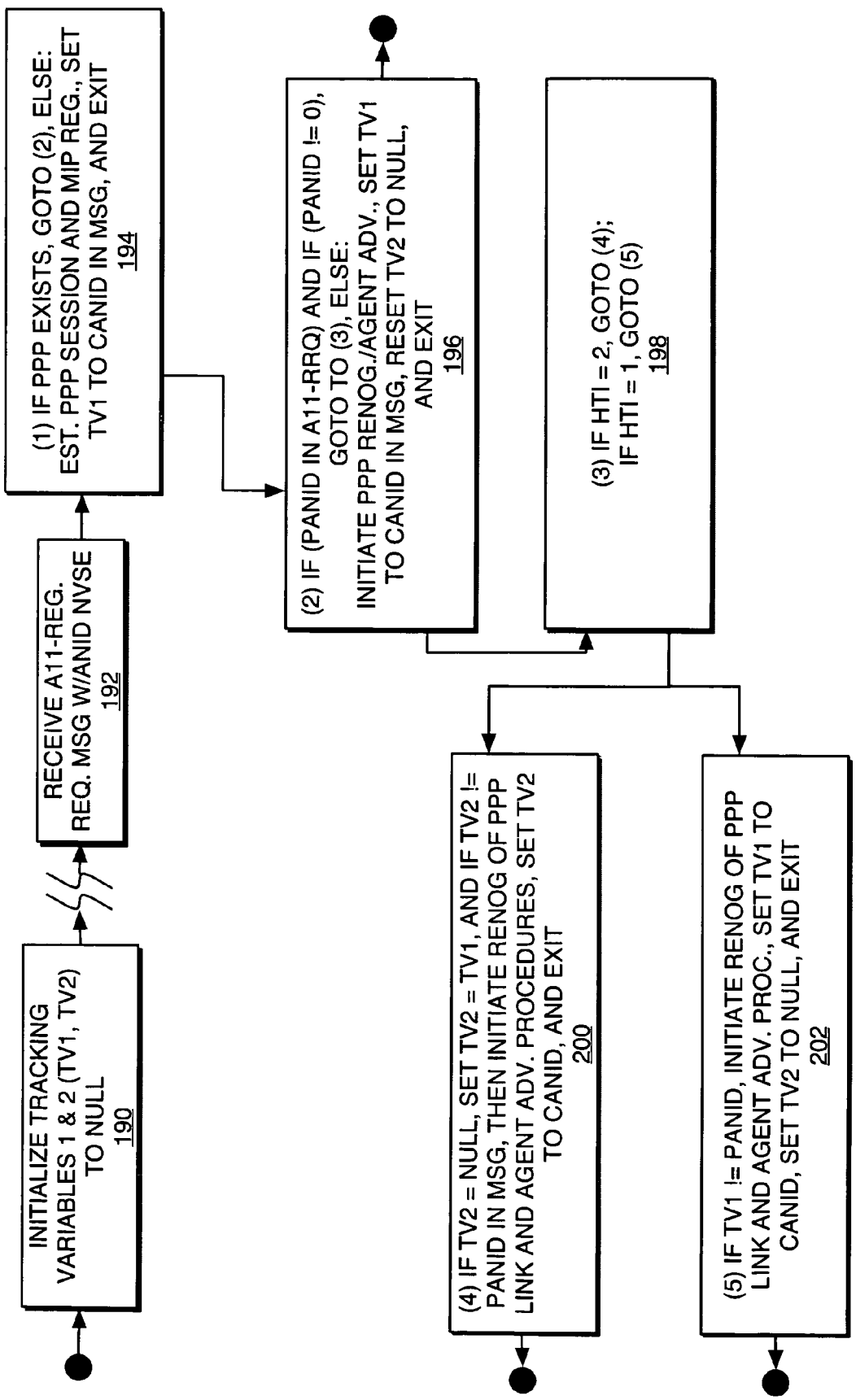
FIG. 9 is a diagram of alternative, exemplary processing logic details corresponding to FIG. 5.

FIG. 9 illustrates an exemplary variation of the above method, wherein PDSN 16 again initializes TV1 and TV2 to null values (Step 190). Then, in response to receiving an A11-RRQ message with an ANID NVSE included (Step 192), PDSN 16 processing continues (Step 194) with (1) a check of whether there is an existent PD link for the mobile station 12 at PDSN 16. If so, processing skips to (2).

Otherwise, the PDSN 16 renegotiates the PD link and carries out agent advertisements as needed, sets TV1 to the received CANID.

If the PDSN 16 skipped to (2), processing continues (Step 196) with a determination of whether a PANID was received in the A11-RRQ message and, if so, whether that PANID had a non-zero value. If both conditions are met, processing skips to (3); otherwise, the PDSN 16 renegotiates the PD link, carries out agent advertisement procedures as needed, sets TV1 to the received CANID, and resets TV2 to the null value. Processing then exits.

If the PDSN 16 skipped to (3), processing continues (Step 198) with an evaluation of the HTI included in the received A11-RRQ message. If the HTI=2 (indicating HHO), the PDSN 16 skips ahead to (4); if HTI=1, the PDSN 16 skips ahead to (5).

If the PDSN 16 skipped to (4), processing continues (Step 200) with the PDSN 16 evaluating whether TV2 is null. If so, PDSN 16 sets TV2 equal to TV1. If TV2 then does not equal the received PANID, PDSN 16 initiates PD link renegotiation/agent advertisement, sets TV2 to the received CANID, and processing exits.

If the PDSN 16 skipped to (5), processing continues (Step 202) with the PDSN 16 evaluating whether TV1 equals the received PANID. If not, PDSN 16 initiates PD link renegotiation/agent advertisement, sets TV1 to the received CANID, sets TV2 to null, and processing exits.

Note that the above processing is similar to that depicted in FIG. 8, but without the use of a qualification timer, and with several variations on when TV2 is updated and/or reset to the null value. In another similar two-variable tracking method, the base station, e.g., BSC 22, is used to hold a third, network-stored tracking variable that is used in reducing the incidence of unnecessary PD link renegotiations.

That is, the exemplary network 10 includes BSCs 22 that "capture" the packet zone location identifier (e.g., ANID) corresponding to packet data call setup, and then "pass" that ANID value along from source BSC to target BSC as part of hard handoff processing. Thus, the exemplary BSC 22 passes the BS_TV and its own (source) ANID as part of hard handoff. In contrast, the conventional BSC approach to hard handoff processing is for the source BSC to pass only its own ANID to the target BSC.

By passing the ANID value associated with call setup, the network passes along the same value stored by the mobile station 12 at call setup. Thus, because the mobile station 12 retains that value through successive hard handoffs, the value being passed from BSC 22 to BSC 22 remains consistent with the mobile-stored tracking information. With the BSC-passed information, the last PCF 20 to receive the mobile station 12 in a succession of hard handoffs obtains the ANID corresponding to the packet zone location where the call was originated. Thus, if the mobile station 12 then goes dormant in the packet zone of that last PCF 20, it will send an Origination Message that includes the ANID stored by it at call setup, which will match the BSC-to-BSC passed ANID value previously obtained by the supporting PDSN 16 as part of the last hard handoff. The below processing sets out an exemplary embodiment of this method.

In exemplary processing illustrated in FIG. 10, the source BSC 22 initializes a Base Station Temporary Variable (BS_TV) to null Value (Step 210). When a mobile station 12 establishes a packet data session through the BSC 22, the BSC 22 sets the BS_TV to its own ANID (Step 212). (Note that BSC 22 can maintain as many BS_TVs as it has mobile stations 12 with packet data connections.) Then, if the mobile station's packet data session is cleared or goes dormant, BSC 22 sets the corresponding BS_TV to a null value (step 214).

However, if BSC 22 transfers the mobile station's active packet data session to another BSC 22 in hard handoff, it sends the BS_TV for the mobile station 12 to the target BSC 22, such as through a supporting MSC 26 using an A1 Handoff Required/Handoff Request message (Step 216). Thus, the non-null BS_TV is passed from source-to-target BSC. The target BSC 22 sets its BS_TV for the mobile station 12 to the BS_TV from the source BSC 22, and the target BSC then includes the BS_TV in the A9-SETUP-A8 message to its associated PCF (step 216).

Then, as illustrated in FIG. 11, when the associated PCF 20 generates a corresponding A11-RRQ message for the mobile station 12, responsive to receiving the aforementioned A9-Setup-A8 message from the target BSC 22, it includes an ANID NVSE, wherein the PANID field is set to the ANID IE as received from the target BSC 22. It further sets the message CANID value to its own ANID (Step 220). Further, for hard handoffs, PCF 20 includes the BS_TV value in the A11-RRQ message. In this context, the inclusion of a BS_TV as a NVSE serves as an implicit indication of hard handoff to the target PDSN 16 and, thus, an explicit HTI need not be used.

Figure 12:
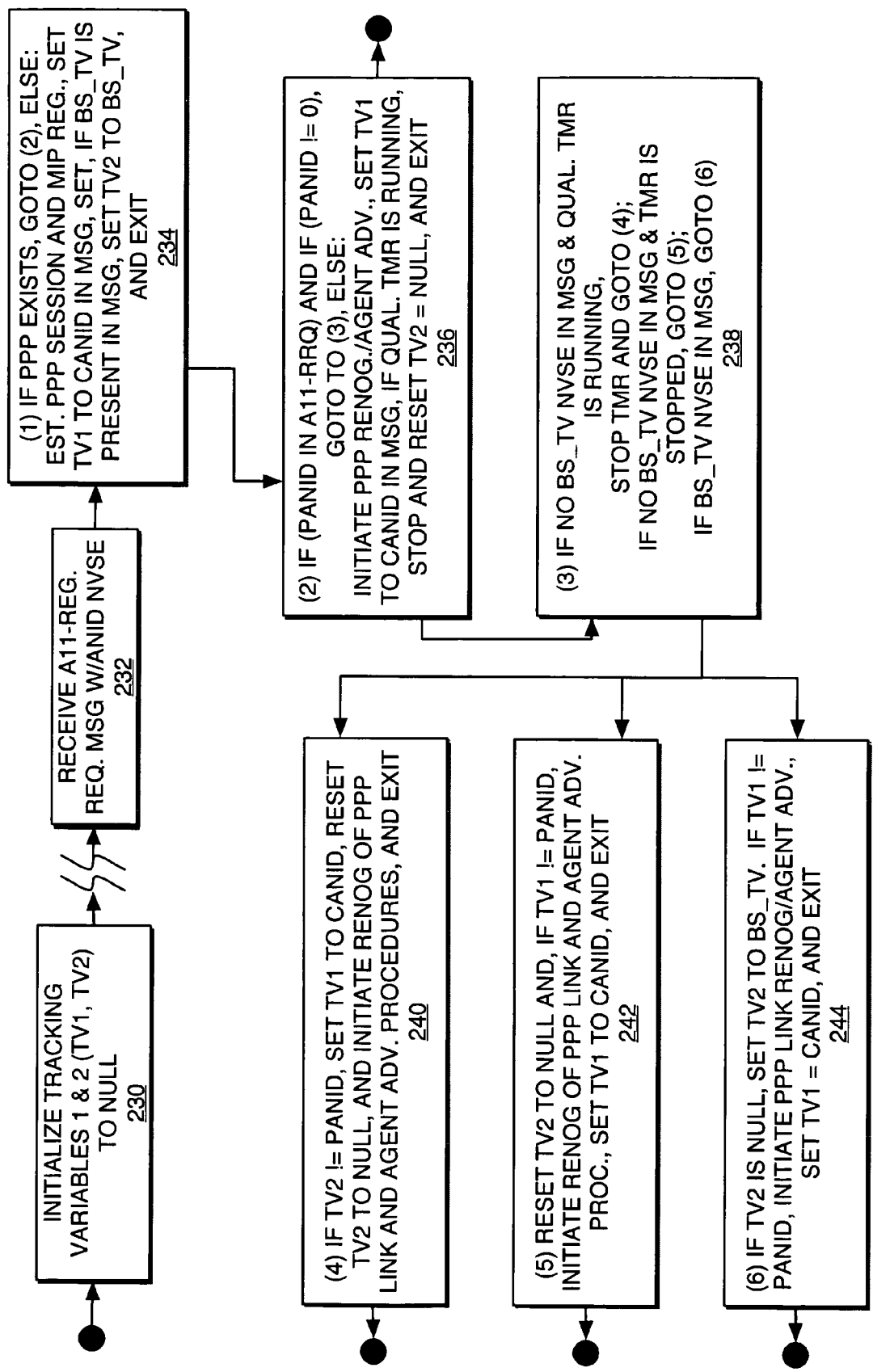
FIG. 12 is a diagram of exemplary processing logic for a PDSN complementing the processing of FIGS. 10 and 11.

FIG. 12 illustrates exemplary PDSN processing logic complementing the use of a third tracking variable at BSC 22, i.e., the use of BS_TV included by means of a NVSE, and is similar to that shown in FIG. 8. Processing begins with the initialization of tracking variables TV1 and TV2 to null values by PDSN 16 (Step 230). Upon receiving an A11-RRQ message with an ANID NVSE (Step 232), the PDSN 16 exercises exemplary processing logic as follows: (1) if a PD link (PPP session) exists for the mobile station 12, processing skips to (2); otherwise, the PDSN 16 establishes a PD link for mobile station 12, carries out MIP registration, sets TV1 to the received CANID, sets TV2 to the BS_TV ANID if one is received in the A11-RRQ message, and exits. (Step 234).

If the PDSN 16 skipped to (2), processing continues (Step 236) with a determination of whether a PANID was received in the A11-RRQ message and, if so, whether that PANID had a non-zero value. If both conditions are met, processing skips to (3); otherwise, the PDSN 16 renegotiates the PD link, carries out agent advertisement procedures as needed, sets TV1 to the received CANID, and, if the qualification timer is unexpired (running), PDSN 16 stops the timer and resets TV2 to the null value. Processing then exits.

If the PDSN 16 skipped to (3), processing continues (Step 238) with an evaluation of whether the A11-RRQ message included a BS_TV NVSE, and whether the qualification timer is running. If no BS_TV was received and the timer is running, the PDSN 16 stops the timer and skips ahead to (4); if no BS_TV was received and the timer is not running, the PDSN 16 skips ahead to (5); otherwise, if the BS_TV was received in the A11-RRQ message, the PDSN 16 skips ahead to (6).

If the PDSN 16 skipped to (4), processing continues (Step 240) with the PDSN 16 evaluating whether TV2 equals the received PANID. If TV2 does not equal the PANID, PDSN 16 sets TV1 to the received CANID, resets TV2 to null, initiates PD link renegotiation/agent advertisement, and processing exits.

If the PDSN 16 skipped to (5), processing continues (Step 242) with the PDSN 16 resetting TV2 to null, and evaluating whether TV1 equals the received PANID. If TV1 does not equal the PANID, PDSN 16 sets TV1 to the received CANID, initiates PD link renegotiation/agent advertisement, and processing exits.

If the PDSN 16 skipped to (6), processing continues (Step 244) with the PDSN 16 evaluating whether TV2 is null. If so, PDSN 16 sets TV2 to the received BS_TV. Further, if TV1 does not equal the received PANID, PDSN 16 sets TV1 to the received CANID, initiates PD link renegotiation/agent advertisement, and processing exits.

In the context of the above scenario, consider a circumstance where a packet data call is first setup using BSC1/PCF1/PDSN1. In this case, as a simplistic example of ANID values, BSC1 stores MS ANID="1" as its BS_TV value. At hard handoff from BSC1 to BSC2, the BS_TV value is passed to BSC2, which in turn forwards it to PCF2, which sends it on to PDSN1 in the corresponding A11-RRQ message. PDSN1 thus will initialize TV2 to the value of the MS ANID as set by BSC1. Proceeding with a subsequent handoff from BSC2 to BSC4, for example, the MS ANID value is passed along to BSC4 and, eventually, to PDSN2. At that point, PDSN2 initializes TV2 to the MS ANID value (i.e., to the BSC1 ANID), which means that PDSN2 stores a PANID value accurately reflecting the original BSC under which the mobile station 12 established its packet data call.

Notably, mobile station 12 still stores BSC1 ANID because it has not updated its tracking value through the series of hard handoff. Thus, if mobile station 12 goes dormant in PZ4, it will recognize a mismatch between its stored packet zone identifier and the packet zone identifier being broadcast in PZ4. In response to recognizing that mismatch, mobile station 12 sends an origination message with PANID=BSC1 ANID. That PANID eventually gets passed to PDSN2, which uses it to make the decision whether PPP link renegotiation is required. Because the above processing logic provides PDSN2 with the BSC1 ANID by way of the BS_TV, which was passed along during hard handoff, the PANID value stored at PDSN2 (i.e., the TV2 value) matches the PANID received from the mobile station 12 and, thus, the dormant handoff event does not trigger an unnecessary PPP link renegotiation.

Thus, according to the above logic, the PDSN 16 maintains a first variable (TV1) that is initialized to the current packet zone location of the mobile station 12, and a second variable (TV2) that is initialized to a null value. TV2 is then updated to match the changed packet zone location of a mobile station 12 responsive to the first hard handoff of the mobile station with respect to the PDSN 16. The value of TV2 is then used to test whether PD link renegotiation is needed for the first dormant handoff of the mobile station 12 under the PDSN 16, subject to the time qualification imposed by the qualification timer, which is started when the mobile station 12 first goes dormant under the PDSN 16. In all cases, TV1 is updated to reflect the CANID associated with the mobile station 12 responsive to renegotiating the mobile station's PD link.

By implementing tracking variable storage at the BSCs 22 in the above manner, the ANID of the BSC under which a mobile station 12 establishes or reactivates a packet data call can be made to "follow" the hard handoffs of the mobile station 12 through one or more subsequent BSCs. In that manner, the PDSNs 16 that receive the mobile station 12 in hard handoff can store the ANID of the BSC 22 that started the chain of hard handoffs. Since that ANID will be the one retained by mobile station itself while the packet data call is active, the first dormancy-related origination by the mobile station 12 will include ANID information that will match the BSC-to-BSC transferred ANID that followed the mobile station 12 through the succession of hard handoffs.

Figure 13:
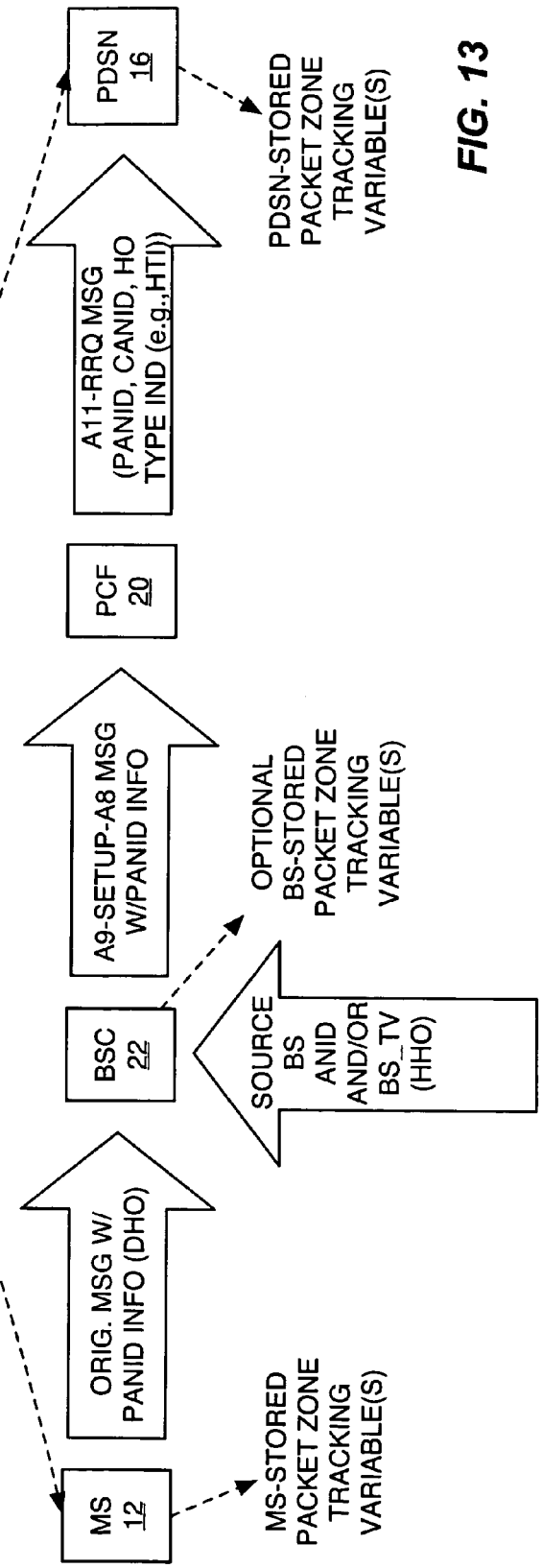
FIG. 13 is a diagram of exemplary packet zone identifier (ANID) information flow and tracking variable storage in the context of one or more embodiments of the present invention.

With all such embodiments in mind, FIG. 13 illustrates several possible exemplary tracking variable and ANID information flows in accordance with the present invention. One sees that the PD link is, as noted before, anchored at respective ends by the mobile station 12 and the PDSN 16. For origination (or enhanced origination) messages from mobile station 12, such as arising in dormant handoff, PANID information based on a mobile-remembered packet zone tracking variable flows to PDSN 16 via the intervening BSC 22 and PCF 20. For hard handoff events, PANID information for the mobile station 12 generally is passed from the source BSC to the target BSC directly, or indirectly via an associated MSC.

Figure 14:
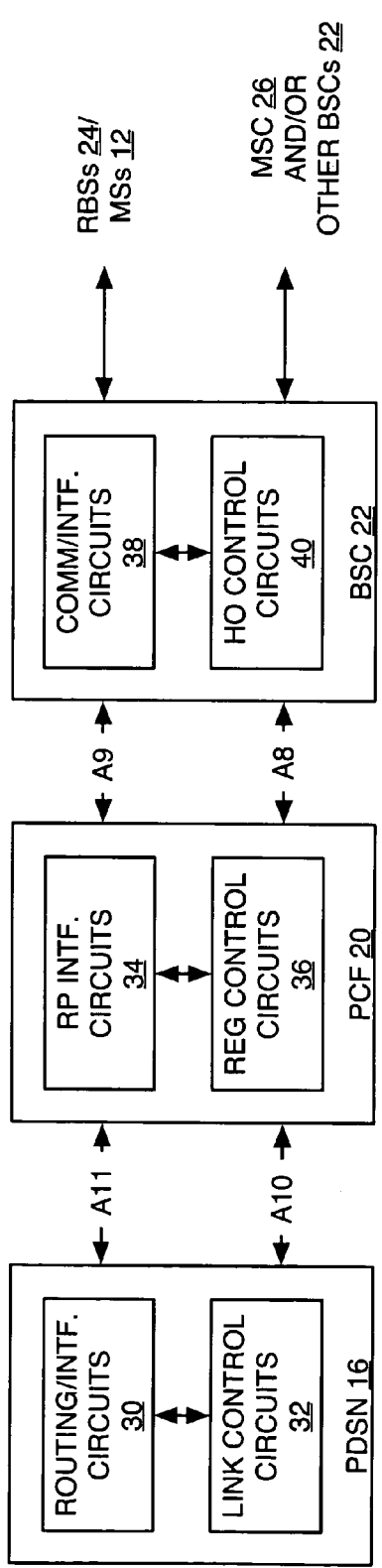
FIG. 14 is a diagram of exemplary functional processing circuit arrangements for a PDSN, PCF, and BSC, according to one or more embodiments of the present invention.

In any case, the exemplary PDSN 16 uses one or more stored tracking variables as a basis for comparison against the received PANID information and, according to the above exemplary embodiments, PDSN 16 uses its stored information in selective updating and checking procedures to avoid unnecessary PD link renegotiations. FIG. 14 illustrates exemplary functional circuit arrangements for the PDSN 16, PCF 20, and BSC 22, that can be configured as needed to carry out the present invention according to any of the exemplary embodiments discuss herein, or according to variations thereof that might occur to those skilled in the art.

To that end, PCF 16 comprises routing/interface circuits 30, and link control circuits 32, which may comprise one or more microprocessor or other logic circuits that are configured to carry out the above variable storage and selective updating processes for each PD link being supported by PDSN 16. It should be understood, then, that exemplary processing as described herein may be carried out in hardware, software, or any combination thereof. For example, link control circuits 32 may comprise one or more microprocessor circuits configured to execute program instructions embodying exemplary PDSN-based packet zone tracking as described herein.

Further, in support of the present invention, the exemplary PCF 20 comprises Radio-Packet (RP) interface circuits 34, and registration control circuits 36. In this context, the registration control circuits 36 comprise one or more processing circuits that are configured to carry out exemplary A11-RRQ message generation, to thereby provide PDSN 16 with an explicit or implicit indication of the type of handoff giving rise to the message generation.

Likewise, the exemplary BSC 22 comprises communication control and interface circuits 38, and handoff control circuits 40. In this context, the handoff control circuits 40 comprise one or more processing circuits that are configured to carry out exemplary temporary variable storage in accordance with embodiments of the invention wherein the BSCs provide storage for a third tracking variable that can be included in the A11-RRQ message for use by the PDSN 16.

Those skilled in the art should understand that, while FIG. 14 provides an exemplary functional arrangement for processing circuits at the PDSN 16, PCF 20, and BSC 22, in support of the present invention, these network entities can be quite complex in actual implementation. Indeed, the implementation architecture of such entities varies according to the particular designs adopted by the various equipment vendors.

Thus, it should be understood that other functional implementations, and other circuit arrangements can be configured to carry out the exemplary methods described herein. Therefore, the present invention is not limited by the depicted arrangements. Indeed, the present invention is not limited by any of the figures, nor by the foregoing discussion, but rather is limited only by the following claims and their reasonable equivalents.

What is claimed is:

1. A wireless communication network comprising:
   a Packet Data Serving Node configured to support packet data connections with a plurality of mobile stations, and to condition re-negotiation of a packet data connection maintained by it for a given mobile station based on determining whether a mobility event involving movement of that mobile station between packet zones of the network corresponds to a hard handoff or to a dormant handoff;
   a Packet Control Function configured to send registration messages to the Packet Data Serving Node responsive to mobility events, and to include a hard/dormant handoff type indication in said registration messages for use at the PDSN in determining whether a given mobility event corresponds to a hard handoff or to a dormant handoff; and
   a Base Station Controller configured to store packet zone tracking variables for mobile stations, and, for a given mobile station, further configured to set the corresponding packet zone tracking variable to the Base Station Controller's own Access Network Identifier if a new packet data connection is established for the given mobile station, and to set the corresponding packet zone tracking variable to a received value obtained from another Base Station Controller if the given mobile station is received in hard handoff from the other Base Station Controller.

2. The network of claim 1, wherein the Base Station Controller is configured to pass the received value along to the PCF as part of receiving the given mobile station in hard handoff, such that a prior packet zone location of the given mobile station is obtained from the received value.

3. A method of reducing the incidence of unnecessary packet data link renegotiations between a wireless communication network having a plurality of packet zones and a mobile station comprising:
   renegotiating the packet data link responsive to determining that a received packet zone tracking variable included in a handoff-related message associated with the mobile station mismatches a stored packet zone tracking variable maintained at a network routing entity managing the packet data link; and
   updating the stored packet zone tracking variable to match a current packet zone of the mobile station if the packet data link is renegotiated responsive to dormant handoff of the mobile station between packet zones but not if the packet data link is renegotiated responsive to hard handoff of the mobile station between packet zones.

4. The method of claim 3, wherein updating the stored packet zone tracking variable if the packet data link is renegotiated responsive to dormant handoff of the mobile station between packet zones but not if the packet data link is renegotiated responsive to hard handoff of the mobile station between packet zones comprises updating the stored packet zone tracking variable if the handoff-related message indicates a dormant handoff and if the packet data link is renegotiated responsive to receiving the handoff-related message.

5. The method of claim 4, wherein the routing entity comprises a Packet Data Serving Node in the network, and wherein the handoff-related message comprises a registration request message sent from a Packet Control Function in the network to the Packet Data Serving Node, said Packet Control Function communicatively coupling the Packet Data Serving Node to a Radio Access Network in wireless communication with the mobile station.

6. The method of claim 5, further comprising, at the Packet Data Serving Node, determining whether a given mobility event is a hard handoff event or a dormant handoff event based on evaluating one or more indicators in the registration request message.

7. The method of claim 6, further comprising, at the Packet Control Function, setting the one or more indicators to indicate a dormant handoff event, or to indicate a hard handoff event, in dependence on a handoff-related message sent to the Packet Control Function from a Base Station that is communicatively coupled to the mobile station.

8. A system for use in a wireless communication network, the system comprising a Packet Data Serving Node including one or more control circuits configured to reduce unnecessary packet data link renegotiations between the Packet Data Serving Node and a mobile station having a packet data link with the network, said one or more control circuits configured to:
   renegotiate the packet data link responsive to determining that a received packet zone tracking variable included in a handoff-related message associated with the mobile station mismatches a stored packet zone tracking variable maintained at the Packet Data Serving Node; and
   update the stored packet zone tracking variable to match a current packet zone of the mobile station if the packet data link is renegotiated responsive to dormant handoff of the mobile station between packet zones but not if the packet data link is renegotiated responsive to hard handoff of the mobile station between packet zones.

9. The system of claim 8, wherein the Packet Data Serving Node further is configured to invoke foreign agent advertisements responsive to renegotiating the packet data link with the mobile station.

10. The system of claim 8, wherein the Packet Data Serving Node is configured to update the stored packet zone tracking variable if the handoff-related message indicates a dormant handoff and if the packet data link is renegotiated responsive to receiving the handoff-related message.

11. The system of claim 10, further comprising a Packet Control Function that is configured to send handoff-related messages to the Packet Data Serving Node, and further configured to set one or more message indicators included in the handoff-related message to indicate to the Packet Data Serving Node whether the handoff-related message corresponds to a hard handoff of the mobile station, or to a dormant handoff of the mobile station.

12. The system of claim 11, wherein the Packet Data Serving Node is configured to determine whether the handoff-related message received from the Packet Control Function corresponds to a dormant handoff of the mobile station, or to a hard handoff of the mobile station, based on evaluating the one or more message indicators set by the Packet Control Function.

13. A method of reducing packet data link renegotiations between a wireless communication network having a plurality of packet data zones and a mobile station, the method comprising:
   maintaining first and second tracking variables in the network for tracking packet zone movement of the mobile station by selectively updating the first tracking variable responsive to hard handoff of the mobile station between packet zones, and selectively updating the second tracking variable responsive to dormant handoff of the mobile station between packet zones;

for hard handoffs of the mobile station, selectively triggering renegotiation of the packet data link based on comparing the first tracking variable to a previous packet zone identifier received for the mobile station in association with a hard handoff mobility event; and for dormant handoffs of the mobile station, selectively triggering renegotiation of the packet data link based on comparing the second tracking variable to a previous packet zone identifier received for the mobile station in association with a dormant handoff mobility event.

14. The method of claim 13, further comprising initializing the first tracking variable to a current packet zone identifier associated with the mobile station, and initializing the second tracking variable to a null value.

15. The method of claim 14, further comprising, for a hard handoff of the mobile station, setting the second tracking variable to match a current packet zone identifier associated with the mobile station, if the second tracking value is non-null.

16. The method of claim 13, wherein, for hard handoffs of the mobile station, selectively triggering renegotiation of the packet data link based on comparing the first tracking variable to a previous packet zone identifier received for the mobile station in association with a hard handoff mobility event comprises comparing the first tracking variable to a previous packet zone identifier as included in a handoff-related message received for the mobile station, and triggering renegotiation of the packet data link responsive to detecting a mismatch therebetween.

17. The method of claim 16, wherein triggering renegotiation of the packet data link comprises initiating a Point-to-Point Protocol connection renegotiation between a Packet Data Serving Node in the wireless communication network and the mobile station.

18. The method of claim 13, wherein selectively updating the first tracking variable responsive to hard handoff of the mobile station between packet zones comprises keeping the first tracking variable updated responsive to hard handoffs of the mobile station.

19. The method of claim 13, wherein selectively updating the second tracking variable responsive to dormant handoff of the mobile station between packet zones comprises updating the second tracking variable responsive to a first hard handoff occurring after initialization of the second tracking variable, and resetting the second tracking variable to the null value responsive to expiration of a qualification timer.

20. The method of claim 19, further comprising starting the qualification timer responsive to receiving a first indication that all data connections associated with the packet data link for the mobile station are dormant.

21. The method of claim 13, wherein maintaining first and second tracking variables in the network for tracking packet zone movement of the mobile station comprises maintaining the first and second tracking variables as stored values at a Packet Data Serving Node in the network.

22. The method of claim 21, further comprising determining whether a given mobility event involving the mobile station corresponds to a hard handoff, or corresponds to a dormant handoff of the mobile station, based on evaluating a handoff type indication included in a registration request message received at the Packet Data Serving Node for the mobile station in association with the given mobility event.

23. The method of claim 21, further comprising maintaining a third tracking variable at a base station communicatively coupling the Packet Data Serving Node to the mobile station, wherein maintaining the third tracking variable comprises setting the third tracking variable to an Access Network Identifier corresponding to the base station if the packet data link is first established through the base station, setting the third tracking variable to a received value if the mobile station is received from a source base station in hard handoff, and sending the tracking variable as part of transferring the mobile station to a target base station in hard handoff.

24. The method of claim 23, further comprising, at the Packet Data Serving Node, determining whether a given mobility event involving the mobile station corresponds to a hard handoff, or corresponds to a dormant handoff of the mobile station, based on determining whether the third tracking variable is or is not included in a registration request message received at the Packet Data Serving Node for the mobile station in association with the given mobility event.

25. The method of claim 24, further comprising, at the Packet Control Function, including the third tracking variable in the registration request message if the third tracking variable is received in the handoff-related message sent from the Base Station to the Packet Control Function.

26. A system for use in a wireless communication network having a plurality of packet zones, the system comprising a Packet Data Serving Node including one or more control circuits configured to reduce packet data link renegotiations between the network and a mobile station, said one or more control circuits configured to:

maintain first and second tracking variables in the network for tracking packet zone movement of the mobile station by selectively updating the first tracking variable responsive to hard handoff of the mobile station between packet zones, and selectively updating the second tracking variable responsive to dormant handoff of the mobile station between packet zones;

for hard handoffs of the mobile station, selectively trigger renegotiation of the packet data link based on comparing the first tracking variable to a previous packet zone identifier received for the mobile station in association with a hard handoff mobility event; and for dormant handoffs of the mobile station, selectively trigger renegotiation of the packet data link based on comparing the second tracking variable to a previous packet zone identifier received for the mobile station in association with a dormant handoff mobility event.

27. The system of claim 26, wherein the Packet Data Serving node is configured to initialize the first tracking variable to a current packet zone identifier associated with the mobile station at a time where the packet data link with the mobile station is established at the Packet Data Serving Node, and to initialize the second tracking variable to a null value at that time.

28. The system of claim 27, wherein, for hard handoff of the mobile station, the Packet Data Serving Node is configured to set the second tracking variable to match a current packet zone identifier associated with the mobile station if the second tracking value is non-null.

29. The system of claim 26, wherein, for hard handoffs of the mobile station, the Packet Data Serving Node is configured to compare the first tracking variable to a previous packet zone identifier as included in a handoff-related message received for the mobile station, and trigger renegotiation of the packet data link responsive to detecting a mismatch therebetween.

30. The system of claim 29, wherein the Packet Data Serving Node is configured to trigger renegotiation of the packet data link by initiating a Point-to-Point Protocol connection renegotiation between the Packet Data Serving Node and the mobile station.

31. The system of claim 26, wherein the Packet Data Serving Node is configured to keep the first tracking variable updated to responsive to hard handoffs of the mobile station.

32. The system of claim 26, wherein the Packet Data Serving Node is configured to update the second tracking variable responsive to a first hard handoff occurring after initialization of the second tracking variable, and to reset the second tracking variable to the null value responsive to expiration of a qualification timer.

33. The system of claim 32, wherein the Packet Data Serving Node is configured to maintain the qualification timer in operative association with its one or more control circuits, and wherein the Packet Data Serving Node is configured to start the qualification timer responsive to receiving a first indication that all data connections associated with the packet data link for the mobile station are dormant.

34. The system of claim 33, wherein the Packet Data Serving Node is configured to determine whether a given mobility event involving the mobile station corresponds to a hard handoff, or corresponds to a dormant handoff of the mobile station, based on evaluating a handoff type indication included in a registration request message received at the Packet Data Serving Node for the mobile station in association with the given mobility event.

35. The system of claim 33, further comprising a Base Station that is communicatively associated with the Packet Data Serving Node, and that is configured to maintain a third tracking variable for the mobile station that is used as an indicator to the Packet Data Serving Node as to whether the given mobility event corresponds to dormant handoff or to hard handoff.

36. The system of claim 33, further comprising a Base Station that is communicatively associated with the Packet Data Serving Node, and that is configured to maintain a third tracking variable by setting the third tracking variable to an Access Network Identifier corresponding to the Base Station if the packet data link is first established through the Base Station, setting the third tracking variable to a received value if the mobile station is received from a source Base Station in hard handoff, and sending the tracking variable as part of transferring the mobile station to a target Base Station in hard handoff.

37. The system of claim 36, wherein the Packet Data Serving Node is configured to determine whether the given mobility event corresponds to a hard handoff or to a dormant handoff based on determining whether the third tracking variable is or is not included in a registration request message received at the Packet Data Serving Node for the mobile station in association with the given mobility event.

38. The system of claim 37, further comprising a Packet Control Function communicatively coupling the Base Station to the Packet Data Serving Node, and wherein the Packet Control Function is configured to include the third tracking variable in the registration request message if the third tracking variable is received at the Packet Control Function from the Base Station in association with the given mobility event.

39. A method of reducing renegotiations of a packet data link between a mobile station and a supporting wireless communication network having a plurality of packet zones, the method comprising:
  initializing a first tracking variable to match a current packet zone identifier of the mobile station, and initializing a second tracking variable to a null value;
  determining whether a handoff-related message received for the mobile station is a hard handoff mobility event or a dormant handoff mobility event;
  for hard handoff mobility events, if a previous packet zone identifier included in the handoff-related message mismatches the first tracking variable stored at the network for the mobile station, triggering packet data link renegotiations, updating the first tracking variable to match a current packet zone identifier included in the handoff-related message, and updating the second tracking variable, if non-null, to match the previous packet zone identifier;
  for dormant handoff mobility events, if a qualification timer has not expired, and, if the previous packet zone identifier included in a handoff-related message mismatches the second tracking variable, triggering packet data link renegotiations, updating the first tracking variable to match the current packet zone identifier, and resetting the second tracking variable to null; and
  for dormant handoff mobility events, if the qualification timer has expired, resetting the second tracking variable to null, and, if the first tracking variable mismatches the current packet zone identifier, triggering packet data link renegotiations and updating the first tracking variable to the current packet zone identifier.

40. A Base Station for use in a wireless communication network comprising one or more control circuits configured to maintain packet zone tracking variables for mobile stations being supported by the Base Station, said one or more control circuits configured to:
  set a tracking variable to an Access Network Identifier of the Base Station responsive to a packet data connection being first established with a first given mobile station, and subsequently pass that tracking variable if the Base Station transfers the first given mobile station in hard handoff; and
  receive a tracking variable in a hard handoff message associated with receiving a given second mobile station in hard handoff, and subsequently pass that tracking variable if the Base Station transfers the second given mobile station in hard handoff.

* * * * *